United States Patent [19]

Bagley et al.

[11] Patent Number: 5,277,937
[45] Date of Patent: Jan. 11, 1994

[54] METHOD FOR CONTROLLING THE CONDUCTANCE OF A HEATED CELLULAR SUBSTRATE

[75] Inventors: Rodney D. Bagley, Big Flats; Jacqueline L. Brown, Corning, both of N.Y.

[73] Assignee: Corning Incorporated, Corning, N.Y.

[21] Appl. No.: 893,249

[22] Filed: Jun. 3, 1992

[51] Int. Cl.$^5$ .................... B05D 1/32; B05D 7/22; B01J 35/04; B01J 37/02
[52] U.S. Cl. .................. 427/553; 427/126.3; 427/126.4; 427/259; 427/270; 427/282; 427/243; 427/376.2; 502/439; 502/527
[58] Field of Search ............ 422/174; 60/300, 303; 502/527, 253, 251, 202, 242, 439; 427/282, 126.2, 126.4, 123, 243, 126.3, 376.2, 553, 259, 270; 204/192.1; 430/430, 404, 419

[56] References Cited

U.S. PATENT DOCUMENTS

| | | | |
|---|---|---|---|
| 3,486,871 | 12/1969 | Martin | 501/10 X |
| 3,681,097 | 8/1972 | Beall et al. | 501/4 |
| 4,015,048 | 3/1977 | Martin | 428/428 |
| 4,301,324 | 11/1981 | Kumar et al. | 174/256 |
| 4,311,729 | 1/1982 | Itakura et al. | 427/80 |
| 4,532,228 | 7/1985 | Golino et al. | 502/527 X |
| 4,535,589 | 8/1985 | Yoshida et al. | 60/303 |
| 4,714,687 | 12/1987 | Holleran et al. | 501/9 |
| 4,906,514 | 3/1990 | Francis et al. | 428/209 |
| 4,964,923 | 10/1990 | Takeuchi et al. | 427/96 |
| 4,985,376 | 1/1991 | Sunahara et al. | 501/22 |
| 5,008,149 | 4/1991 | Taga et al. | 428/336 |
| 5,011,732 | 4/1991 | Takeuchi et al. | 428/209 |
| 5,066,620 | 11/1991 | Sunahara et al. | 501/21 |

FOREIGN PATENT DOCUMENTS 0678020 7/1991 Switzerland ............ 422/174

*Primary Examiner*—W. J. Shine
*Assistant Examiner*—Douglas J. McGinty
*Attorney, Agent, or Firm*—Angela N. Nwaneri

[57] ABSTRACT

This invention relates to a method for controlling the conductance of heated structures used to initiate faster light-off in emission control systems such as used for automotive catalytic converters, diesel particulate filters and industrial stacks and other applications in which the exhaust gas stream temperature is too low to initiate fast light-off. The invention also relates to a method for minimizing the amount of conductive material used for making such structures.

15 Claims, 5 Drawing Sheets

METHOD FOR CONTROLLING THE CONDUCTANCE OF A HEATED CELLULAR SUBSTRATE

BACKGROUND

This invention relates to a method for controlling the conductance of a heated cellular substrate. The invention also relates to a method for minimizing the amount of conductive material required to form the resistance heater on the end surface of a cellular substrate.

It is estimated that about 50% of the pollutants escaping into the atmosphere from automotive exhaust gases for example, is generated in the period of one to two minutes after a cold engine start-up. By reducing the light-off time, the amount of pollutants escaping into the atmosphere can be reduced. Modifications are being made to catalytic converters to increase the rate of heating in order to obtain shorter light-off times. Copending U.S. application No. 07/893,256, titled "Heated Cellular Substrates," by Bagley et al., filed concurrently herewith and incorporated herein by reference, discloses a method for preheating a cellular structure or honeycomb to provide an early light-off catalytic converter by forming a resistance heater directly onto the surface of the structure and providing means for heating the structure, for example, by passage of electrical current. According to the reference, the conductance of a heated cellular substrate is a function of the cell wall thickness and the thickness of the conductive material applied to the substrate. Higher conductances (lower resistances) are obtained with substrates having thicker cell walls when the cell walls are coated with a conductive material than for thin wall substrates.

Typical cell wall thicknesses for ceramic automotive catalytic converters vary from the range of 0.11 to 0.15 mm for thin wall substrates to 0.18 to 0.20 mm for the standard wall substrates. As a result, the available path for current flow in the thin cell wall substrates is approximately half of that provided by the standard wall substrates. Therefore, when the same thickness of conductive material is formed on a thin and a standard wall substrate, the conductance of the thin wall substrate is significantly less than that of the standard wall substrate.

The heater is generally formed on the end portion of the cell walls which represent only a minor percentage of the substrate surface area. Since most of the conductive material is formed at or near the end portion of the substrate, the resistance is greatly affected by the thickness of the cell walls. As the wall thickness decreases, the resistance increases significantly and conversely, the conductance decreases. Therefore, significantly higher voltages are required to heat thin walled samples.

For automotive application, it is desirable to limit the voltage requirement to less than about 27 volts (that is, the capacity of two standard car batteries.) The voltage requirement can be limited by controlling the resistance of the heater. One way of improving the conductance of coated cellular substrates is to increase the thickness of the conductive material or to apply the conductive material on thicker wall substrates. Since the metals used for heated substrates generally include platinum, rhodium, silver, palladium and other rare and expensive metals, it is desirable to minimize the amount of such metals used for making heated substrates. Accordingly, it is the object of the present invention to provide a method for controlling the conductance of heated substrates. It is also the object of the invention to provide a method for minimizing the amount of conductive material needed to form the conductive layer on such substrates.

SUMMARY OF THE INVENTION

Briefly, the present invention provides a method for controlling the amount of conductive material needed to form a heated structure by providing a substrate having inlet and outlet end portions, providing means for shielding a portion of the cells, and applying a layer of conductive material over the unshielded portion of the substrate.

In another aspect, the invention relates to a method for increasing the effective surface area on which conductive material can be applied by forming an intermediate layer of suitable material on the end surface of the substrate and applying a layer of conductive material over the intermediate layer.

In still another aspect, the present invention provides a method for reducing the surface roughness or porosity of a substrate by applying a smooth layer of suitable material to the substrate.

As used in this specification, cellular or honeycomb structure or body includes any monolithic structure having inlet and outlet end faces, and having a matrix of walls defining a plurality of open-ended cells or passageways extending longitudinally and mutually parallel therethrough between the inlet and outlet end faces of the body. The terms "inlet end portion" and "outlet end portions" as used throughout this specification (including the claims), refer to the regions of the cellular structure adjacent to, close to, or in the region of, the inlet and outlet end faces respectively. Also, as used in this specification, including the claims, the term "precordierite" means material that is a precursor for and reacts to form cordierite upon firing or sintering.

DETAILED DESCRIPTION OF THE INVENTION

Figure 1:
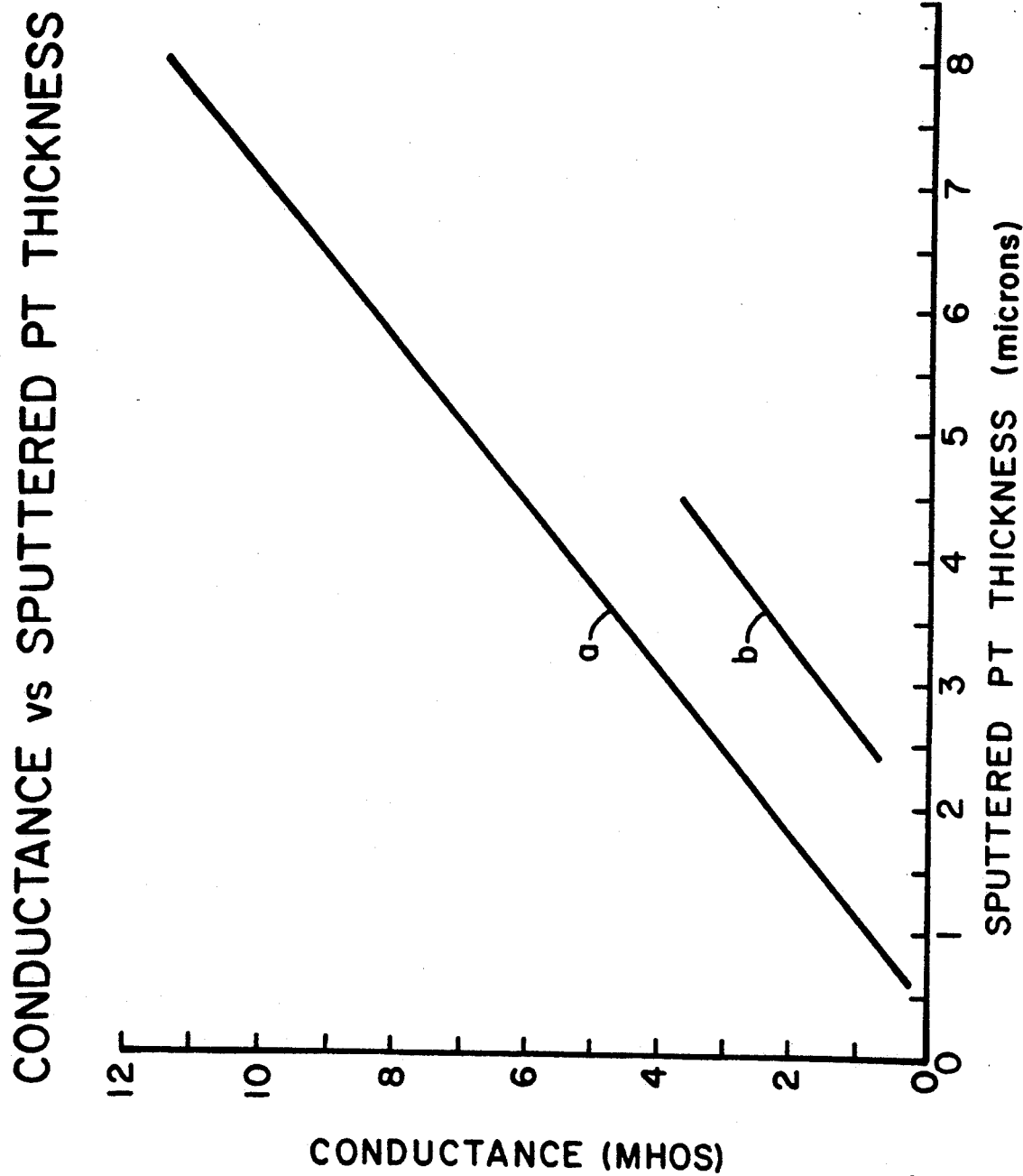
FIG. 1 is a graph showing the relationship between conductance and coating thickness of the conductive layer.

For cellular substrates, the conductive material is generally formed on the end portions of the substrate which represent only a minor percentage of the total substrate surface area. Since most of the heater is formed on the cell walls at or near the end portion of the substrate, the resistance is greatly affected by the thickness of the cell walls. As the cell wall thickness decreases, the resistance increases and conversely, the conductance decreases. FIG. 1 shows that for a cellular substrate of a given composition and similar porosity, the conductance of the metal coating is higher on a standard wall substrate (line a), than for a thin wall substrate, (line b). Therefore, significantly higher voltages would be required to heat thin walled substrates. The following table shows the percent of the end surface area of a 400 cells per square inch substrate occupied by cell walls of various thicknesses:

| Wall thickness (mm) | % end surface which is wall |
|---|---|
| 0.13 | 19.0 |
| 0.15 | 22.6 |
| 0.18 | 26.0 |
| 0.20 | 29.4 |

For ceramic automotive catalytic converters, cell wall thicknesses typically vary from the range of about 0.11 to 0.15 mm for thin wall substrates to about 0.18 to 0.20 mm for the standard wall substrates. For other applications the cell wall thickness may be higher. The cells of catalytic converter substrates are generally open at both the inlet and outlet end faces of the substrates such that the open frontal area is preferably, greater than 50%. For very thin wall substrates, the open frontal area may be as high as about 80%. As a result, the available path for current flow on the thin cell wall substrates may be significantly less than that provided by standard wall or thicker wall substrates. Therefore, when the same thickness of resistance heater is formed on the substrates, the conductance of the thin wall substrate is significantly less than that of the standard wall substrate.

Figure 2:
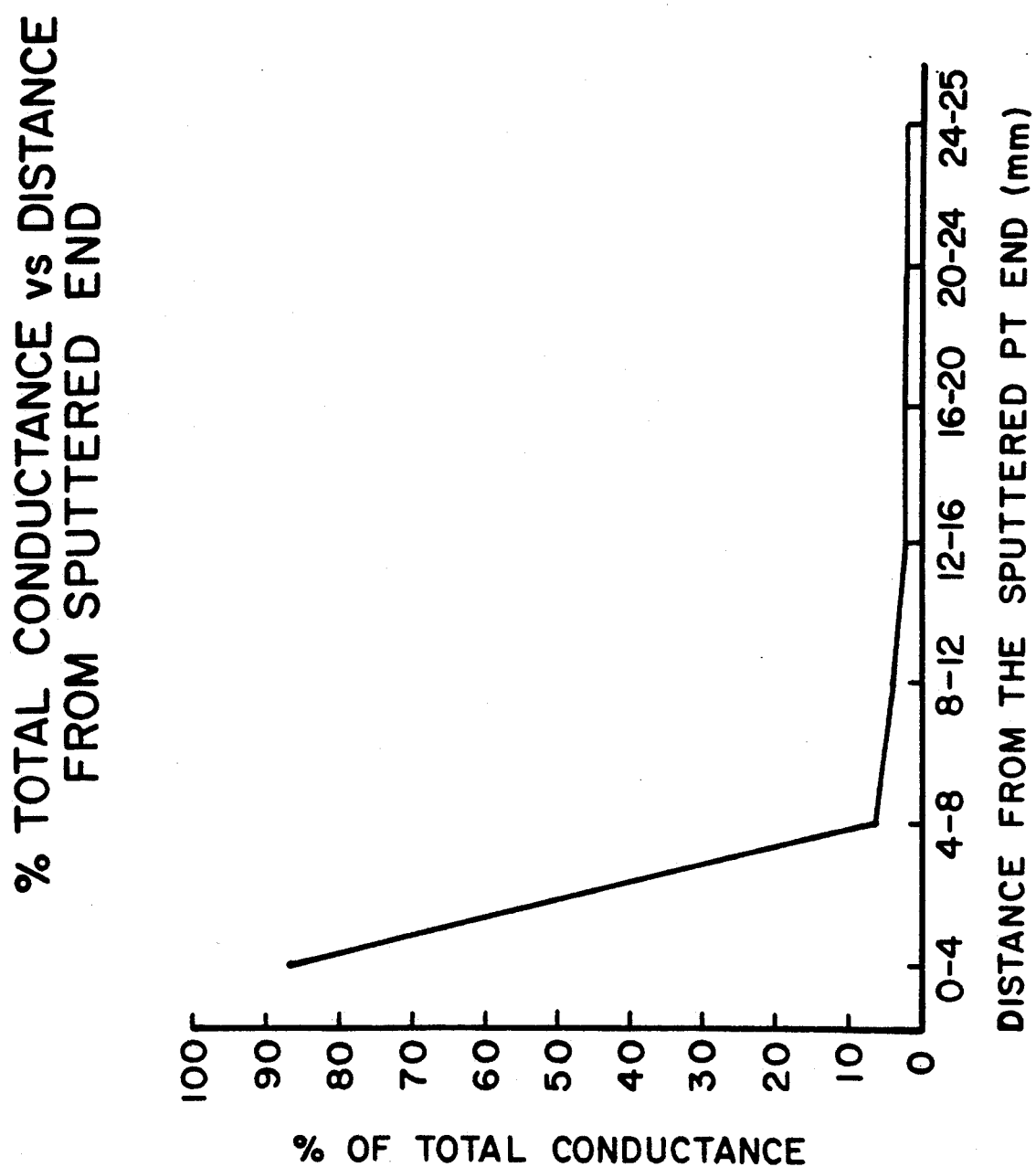
FIG. 2 is a graph showing the variation of conductance along the cell walls as the distance from the coated surface increases.

We have found that when a cellular substrate is sputtered with an electrically conductive material to form a heated structure, the material tends to penetrate down to several millimeters into the cell. By sectioning the coated substrate and mapping the conductance from the outermost surface down to the innermost deposits o electrically conductive coating in the cell walls, we have observed that substantially all of the conductance is limited to within a few millimeters of the end surface. This is depicted in FIG. 2 and described in Experiment 2 below, which shows the measured conductance for a standard wall honeycomb structure having a layer of platinum sputtered on one end portion. As indicated, substantially all of the effective conductance is measured within a few millimeters from the sputtered end surface. By limiting the conductive material to the areas of the substrate where the most conductance is measured, the conductance of the heated substrate can be effectively controlled to improve the heat exchange efficiency of the heated substrate. In addition, the amount of conductive material needed to form the structure can be effectively minimized. This is accomplished for example, by providing means for shielding a portion of the cells and surfaces of the structure, and applying a layer of conductive material over the unshielded portion of the structure.

Figure 3:
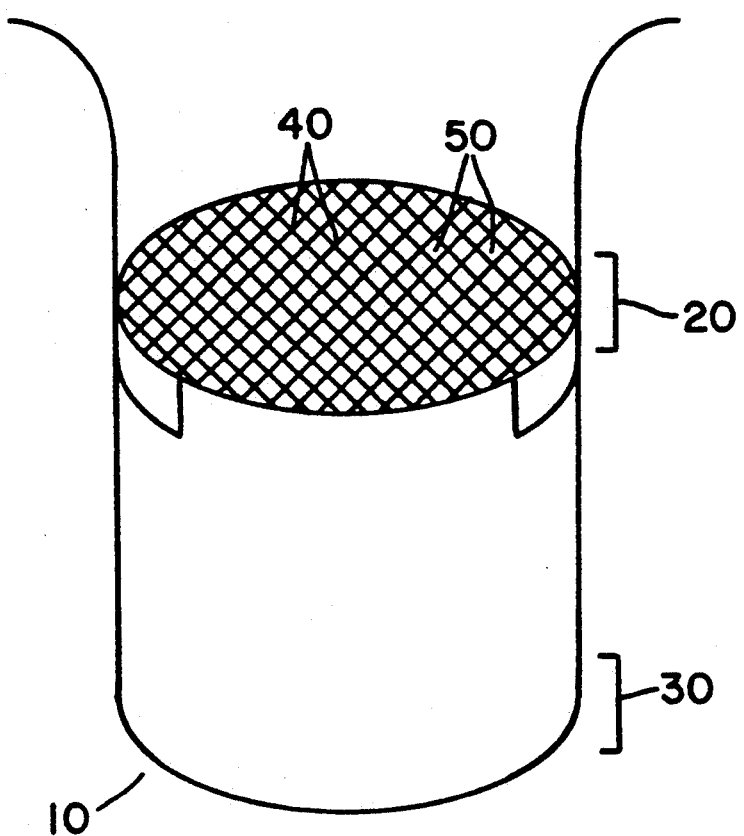
FIG. 3 is a schematic diagram of a heated cellular substrate.

In one particularly useful embodiment, FIG. 3, the present invention provides a method for controlling the conductance of a heated cellular substrate 10 having inlet and outlet end portions, 20 and 30 respectively, and having a matrix of cell walls 40 defining a plurality of cells or passageways 50 extending longitudinally and mutually parallel therethrough, between the inlet and outlet end faces. In a preferred embodiment, the conductive material is formed on a cellular or honeycomb structure having cells or passageways with wall thicknesses in the range of 0.03 to 0.25 mm, preferably, having an open frontal area greater than 50%.

To control the depth of penetration and the amount of electrically conductive material, fritted metal powder which is sintered and having an appropriate viscosity to partially flow down the cells can be applied to the end portions of the cellular substrate and forced down the cells to the desired depth by various methods including rolling, dipping, spraying, and other known methods. Examples of suitable fritted metal powders of this type include fritted platinum powder. In addition, any base metal which is chemically inert to the substrate, washcoat and catalyst such as electroless nickel can be used to coat the substrate. The conductive coating can also be applied to the end portion of the cell walls down to a controlled depth by flame or plasma spraying. If the metal is deposited by sputtering, the depth of penetration can also be controlled by sputtering the conductive material at an oblique angle to the surface of the substrate. Other methods can also be used to control the depth of penetration into the cell walls and to minimize the amount of material deposited on the inlet end portion of the substrate. For example, when the conductive layer is deposited by sputtering, the penetration can be controlled by varying the sputtering voltage applied to the target, the partial pressure of the sputtering gas, the shape of the target and the type of material used for the target.

When the electrically conductive material is applied by sputtering, the penetration and amount of conductive material can be controlled by varying the distance between the target and the substrate, and/or by varying the motion of the substrate relative to the target to control the amount of material deposited within the cells. This is accomplished by varying the distance between the target and the substrate or by maintaining the substrate in a stationary position, or by keeping the substrate in motion as the metal is deposited. In the rotating mode, the sample is swept over the target at regular intervals. In the stationary mode, the sample is mounted and centered directly over the target.

In one embodiment, the penetration and amount of conductive material is controlled by plugging the cells to a predetermined depth and forming a layer of conductive material over the cell walls of the unplugged portion of the cells.

In another embodiment, the depth of penetration and amount of conductive material is controlled by dipping one end of the substrate into a masking material to form a protective layer over part of the cell walls, and forming a layer of conductive material over the unprotected cell walls.

In one particularly useful embodiment, a portion of the substrate is shielded by (1) applying a layer of photoresist material on the substrate, and (2) applying a layer of masking material over a portion of the photoresist layer, preferably, on one end portion of the substrate to protect the masked end portion from light radiation. The substrate is then exposed to light radiation after which the photoresist material is dissolved from the masked end portion. A layer of conductive material is then applied on the end portion from which the photoresist material has been dissolved, and the exposed photoresist is subsequently burned off from the exposed portion of the substrate.

Non-uniform or uneven coatings of the conductive material leads to discontinuities in the flow of electric current and variations in the resistance of the conductive layer. A uniform conductive layer is less likely to form cold or hot spots when the heater is subjected to an electrical load. Cold spots reduce the heat exchange efficiency of the heater, while hot spots tend to burn out the heater. The uniformity of the conductive layer is affected by the degree of roughness of the substrate as high or raised spots tend to have thicker coating than the low or depressed spots which tend to have thinner coatings. Surface smoothness is particularly problematic in the case of porous structures such as certain cordierite honeycomb reactors. For porous substrates, it is desirable to provide a smooth surface on which the resistance heater or conductive material can be applied.

Figure 5:
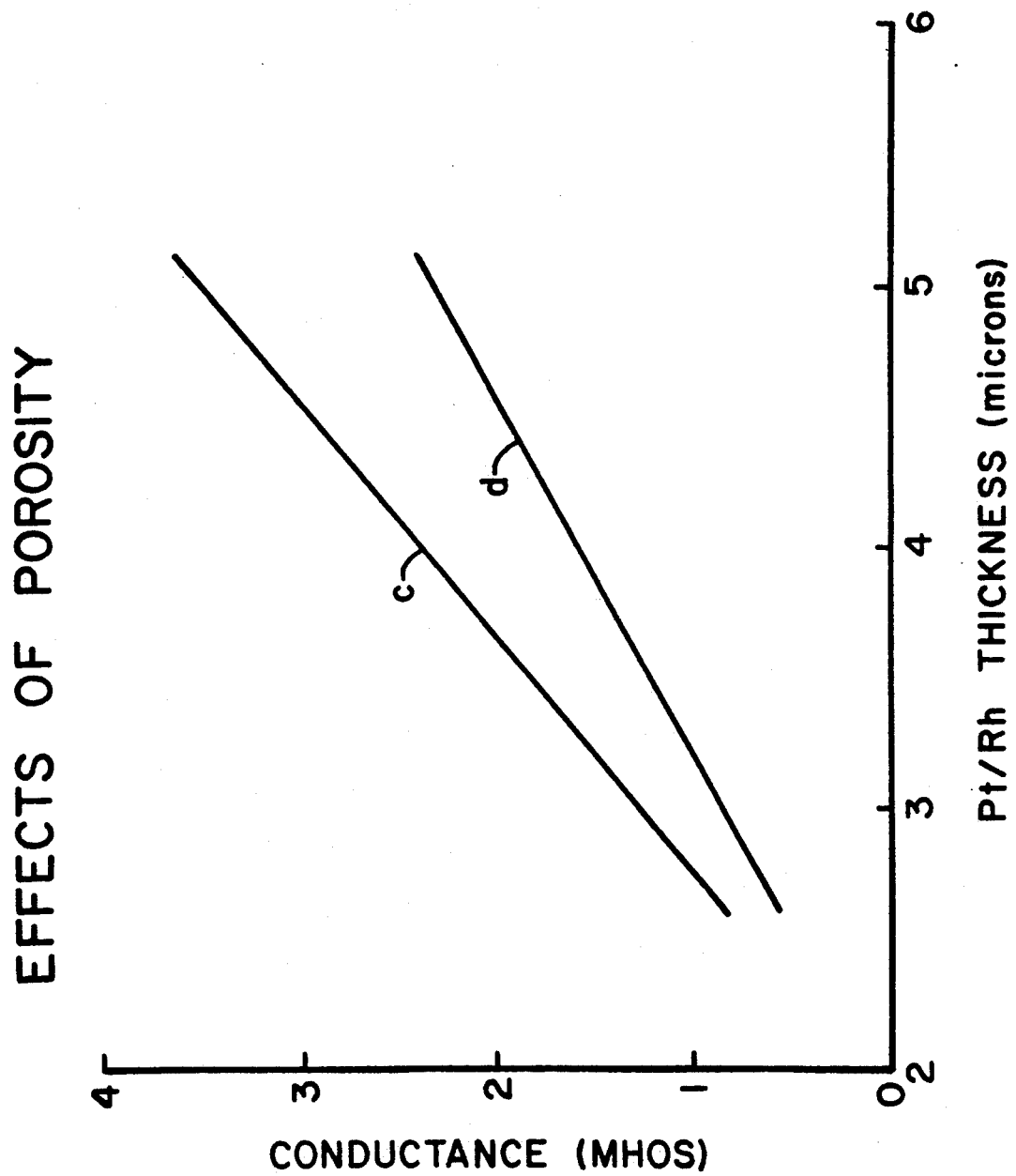
FIG. 5 is a graph showing the effect of porosity on the conductance of a heated substrate.

The amount of material needed to form a resistance heater of a given conductance depends on the method of deposition as well as the porosity of the substrate. The higher the porosity, the less uniform the coating will be and the more material will be required to form a heater having a given conductance. Generally, to form a uniform layer of conductive material over a porous substrate surface, a greater coating thickness is required. The required coating thickness for a given conductance will depend on the percentage of the open frontal area, the width of the current path or the width of the cell walls of the substrate, the resistivity of the conductive material, the porosity of the substrate and the method of deposition. While porosity, cell wall width and conductive layer thickness are important factors in controlling the conductance and heat exchange efficiency of heated substrates, it is believed that porosity is a more significant factor. FIG. 5 shows the effect of porosity on conductance as measured on a cordierite substrate having different thicknesses of a platinum/rhodium conductive layer. As indicated, higher conductances are measured on a thin wall substrate having about 22% porosity (line c), than on a standard wall substrate having about 35% porosity (line d).

If the substrate is too rough, that is, highly porous, substantially more conductive material will be required to form a uniform layer. The more porous the substrate, the thicker the layer of conductive material necessary to obtain a given conductance. On the other hand, if the conductive layer is too thick, spalling or flaking will occur, resulting in discontinuities on the conductive layer. Most honeycomb or cellular substrates are formed of substrates with porosities greater than about 20%, with diesel particulate filter substrates having porosities greater than about 50%. The surface smoothness and therefore, the conductance of the resistance heater formed on porous substrates can be improved by grinding and/or polishing, or by forming a smooth layer on the surface of the substrate prior to forming the layer of conductive material. We have found that, the conductance of the heater, when formed on a porous substrate can be improved by applying an intermediate layer of a suitable material having a thermal expansion matching the thermal expansion of the substrate to the surface of the substrate to reduce the roughness and/or porosity of the surface.

The adherence of the conductive layer to the substrate depends on various factors such as the composition and texture of the substrate, that is, the porosity or degree of smoothness of the substrate surface. If the substrate surface is too smooth the heater may not adhere to the substrate. On the other hand, if the surface is too rough or too porous the conductive layer will be non-uniform and uneven. If the surface is too smooth, adherence can be improved by methods such as etching or abrading the surface or by applying a layer of material such as chrome.

Figure 4:
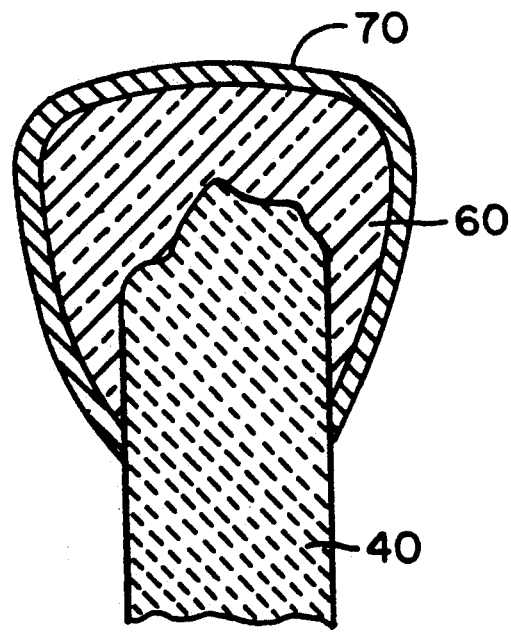
FIG. 4 is a schematic diagram showing the formation of an intermediate layer on a substrate prior to formation of a conductive layer.

In one particularly useful embodiment, FIG. 4 the conductance or resistance of the heated substrate is controlled by applying an intermediate layer 60, of a suitable material to the cell walls 40, to adjust the width of the ends of the cell walls, and then applying a layer of conductive material 70, over the intermediate layer 60. On a porous substrate, the smooth intermediate coating can serve the dual purpose of forming a smooth surface, as well as, providing a means for adjusting the thickness of the cell walls at the inlet end portion. One effect of the intermediate layer is to increase the effective surface area of the conductive material. Thus, by applying a smooth intermediate layer of a suitable material on the substrate, the current path and conductance of the conductive layer can be significantly improved. In addition, when the conductive layer is applied by sputtering, the intermediate layer can also form a shadow or shield over the cells thus, limiting the amount and depth of penetration of the conductive material into the cells.

The smooth intermediate coating can be any material having a thermal expansion similar to the thermal expansion of the substrate. For example, for ceramic substrates, pre-cordierite powder which has been sintered to a high density provides a useful material for the intermediate layer. Examples of other suitable materials for this purpose include glass-ceramic frit such as pre-cordierite frit or other suitable material. Any glass which can be converted to cordierite by sintering as well as other low expansion glass or glass-ceramics can be used for this purpose.

Any glass material which forms a low expansion glass-ceramic upon firing and which is compatible with the substrate and conductive material can be used for the practice of this invention. Examples of suitable materials for this purpose include any low expansion glass or glass-ceramic such as glass-ceramic frit, pre-cordierite frit or other suitable material. Useful glass compositions for this invention are described in U.S. Pat. Nos. 4,714,687; 3,486,871; 4,015,048 and 3,681,097. Particularly useful materials for this invention include any glass-ceramic exhibiting very low coefficient of thermal expansion such as (1) low expansion zinc petalite-beta quartz glass-ceramic having a composition in the ZnO-$Al_2O_3$-$SiO_2$ field, (2) sinterable powdered glass comprising, apart from incidental impurities, MgO, $Al_2O_3$, $SiO_2$ and at least one modifying oxide selected from the group consisting of BaO, PbO, SrO and CaO and which is thermally crystallizable at sintering temperatures to yield a highly crystalline, low expansion, thermally stable glass-ceramic, and (3) lead titanate-containing crystallizable sealing glass consisting essentially, apart from incidental impurities, in weight percent of 60 to 80% of PbO, up to 20% of at least one divalent metal oxide selected from ZnO and BaO such that the total of divalent oxides and PbO is 60 to 80%, 5 to 18% $TiO_2$, at least 1% $B_2O_3$ and at least 5% $SiO_2$, the total of $B_2O_3$ and $SiO_2$ being 10 to 20%. The glass can then be sintered to form a uniform, less porous surface over which the conductive material can be applied as shown in FIG. 4.

In one experiment, both the current path and conductance of a thin wall ceramic honeycomb substrate was significantly improved by coating the inlet end portion of the substrate with an intermediate layer of pre-cordierite which was sintered to form a smooth surface and then forming a layer of electrically conductive material over the smooth surface. The intermediate material can be a smooth sintered surface of any material which will form a low expansion glass, glass-ceramic, or ceramic upon firing. For metal substrates, the intermediate material may be a metal, glass, glass-ceramics, ceramics or any suitable material having similar thermal expansion properties. On metal substrates, the intermediate layer may be applied as an insulating layer or to increase the conductive path of the heater.

Figure 6A:
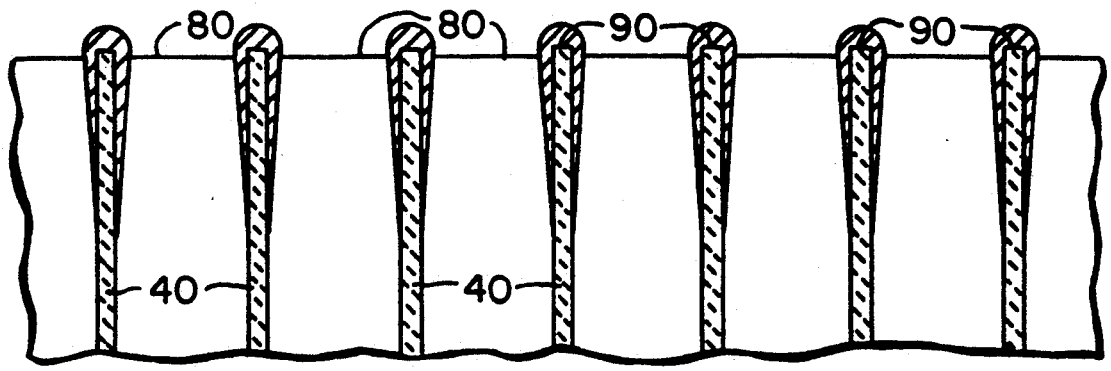
FIGS. 6a and 6b are pictorial views showing layers of conductive material over ridges of cell walls.
Figure 6B:
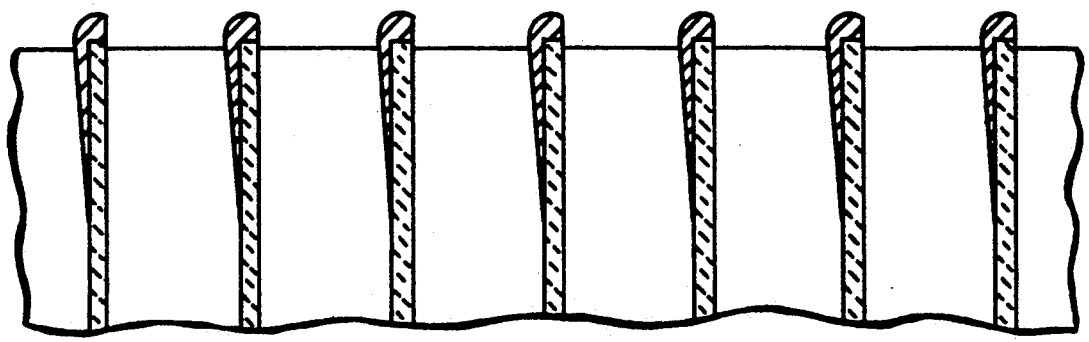

In another embodiment, the surface area is increased by cutting a plurality of slots 80 on the end portion of the substrate to form ridges 90 of cell walls 40, and applying a layer of conductive material 70 on the cell walls 40 as shown in FIGS. 6a. In this embodiment, the conductance can be controlled by applying the conductive material to both sides of the cell walls a shown in FIG. 6a, or to one side as shown in FIG. 6b, depending on the required conductance. The heat exchange efficiency of the heated substrate can be further improved by applying an intermediate layer of a suitable material on the cell walls as shown in FIG. 4, and then applying a layer of conductive material over the intermediate layer.

It is also contemplated by the present invention to improve the heat exchange efficiency of a heated substrate by impregnating a portion of a non-conductive substrate with an electrically conductive material such as chloroplatinic acid, firing the substrate to convert the chloroplatinic acid to platinum, and optionally, applying a layer of conductive material over the platinum.

Figure 7:
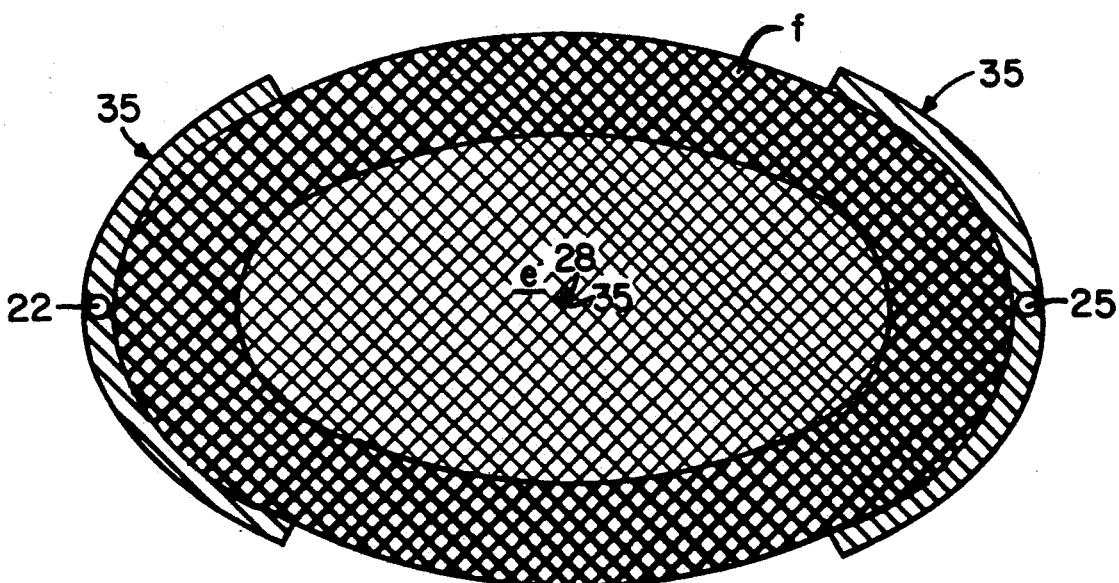
FIG. 7 is a top view of the inlet end surface of the substrate showing the selective application of varying amounts of conductive material over different portions of the substrate surface.

The conductance can also be controlled by varying the current path and heating pattern of the coated substrate. This can be accomplished for example, by selectively varying the thickness, width, and smoothness of the intermediate material on different portions of the substrate as shown in FIG. 7, and as described in Experiment 3 below. By thus varying the conductance and resistance on different portions of the coated surface, the heating pattern can be controlled. Using this technique, heat can be directed away from portions of the heated structure to minimize the effect of differences in coefficient of thermal expansion between the materials used to form the contact and the substrate. In this embodiment, a lead wire attached or contacted to the substrate in region (e) is connected to contacts positioned in the periphery of region (f).

The following tests and experiments are further intended to illustrate the invention but are not intended as limitations.

EXPERIMENT 1

Cell Wall Penetration

Tests were carried out to determine the uniformity and depth of penetration when metal such as platinum, is applied to a cordierite honeycomb substrate by sputtering. The test was first run using a thin wall honeycomb having cell openings of about 0.95×0.95 mm. In one case, the honeycomb substrate was coated by rotating it past a stationary sputtering gun. In the second case, both the sample and the gun were held stationary during the sputtering operation. Platinum penetration was about 7 mm in the stationary sample and in the range of 5.5-6 mm in the rotating sample.

The test was repeated using a standard wall honeycomb structure having cell openings of about 0.8×0.8 mm. Again, the stationary sample showed platinum penetration of about 7 mm while penetration in the rotating sample was in the range of 4.5-5 mm. In all samples, the platinum deposition was thickest at the top surfaces of the cell walls.

EXPERIMENT 2

Conductance Test

This test was performed to determine the effective depth of penetration of the conductive coating. The result is reflected in FIG. 2. The test was run using a 1 inch diameter cordierite honeycomb substrate on which the inlet end portion had been coated with platinum, and on which platinum leads were attached in the manner shown in FIG. 3, by means of electrical contacts or terminations which are chemically compatible with the platinum. The result showed that about 86% of the conductance was within 4 mm of the coated surface, and substantially all of the conductance of the sample was within 8 mm of the coated surface. Beyond this level of penetration, the deposited platinum did not contribute significantly to the conductance. Therefore, only the conductive material formed closest to the surface of the substrate acts as a heater when voltage is applied.

EXPERIMENT 3

Control of Heating Pattern

In this experiment, a layer of intermediate material such as cordierite glass was formed over the end surface of a cordierite cellular substrate and sintered to form a smooth cordierite surface. The center portion (e) of the end surface was then masked and a second layer of cordierite formed over the outer unmasked portion (f) of the end surface. The substrate was again fired to sinter the second layer of cordierite. As a result of this operation, the cell walls in the outer portion (f) of the substrate end surface were thicker than cell walls in the center portion (e). Copper leads or electrodes 25 and 28 were attached to the outer surface of the outer portion (f) and to the center of the center portion (e) respectively, as shown in FIG. 7, by means of electrical contacts or terminations 35 which are chemically compatible with platinum. The substrate was then sputtered with platinum to form the resistance heater of the invention. The outer cell walls in region (f) received more conductive coating than the cell walls in region (e), and as a result, the measured conductance was higher in region (f) than in the center portion (e). When voltage was applied to the structure between the electrode in the center of region (e) and a contact in region (f), the center portion (e) having a higher resistance (lower conductance), heated up faster than the outer portion (f) having a lower resistance (higher conductance).

In addition to the embodiments discussed above, it will be clear to persons skilled in the art that numerous modifications and changes can be made to the above invention without departing from the intended spirit and scope of the invention.

What is claimed:

1. A method for controlling the conductance of a heated structure comprising the steps of providing a monolithic cellular substrate having inlet and outlet end faces, and a matrix of cell walls defining a plurality of cells or passageways extending longitudinally and mutually parallel therethrough between the inlet and outlet end faces, providing on the substrate means for shielding a portion of the substrate, and applying a layer of conductive material over the unshielded portion of the substrate.

2. The method of claim 1, wherein the means for shielding a portion of the substrate comprises the steps of:
   applying photoresist material on the substrate;
   applying masking material on the inlet end portion;
   exposing the structure to light radiation; and
   dissolving the photoresist material from the unexposed inlet end portion.

3. The method of claim 2, further comprising the step of forming an intermediate layer of suitable material on the substrate prior to applying the photoresist material.

4. The method of claim 2, further comprising the step of burning off the exposed photoresist material after the conductive material has been applied to the substrate.

5. The method of claim 1, wherein the means for shielding a portion of the substrate comprises dipping a portion of the substrate into a masking material to form a protective layer over part of the substrate.

6. The method of claim 1, further comprising the step of forming an intermediate layer of suitable material on the substrate.

7. The method of claim 6, wherein the intermediate layer is formed on the inlet end portion of the substrate.

8. The method of claim 6, wherein the intermediate material is selected from the group comprising glass frit, glass-ceramic frit, and cordierite.

9. The method of claim 6, wherein the intermediate material is a low expansion material selected from the group comprising low expansion zinc petalite-beta quartz glass-ceramic having a composition in the $ZnO$-$Al_2O_3$-$SiO_2$ field; sinterable powdered glass comprising, apart from incidental impurities, $MgO$, $Al_2O_3$, $SiO_2$ and at least one modifying oxide selected from the group consisting of $BaO$, $PbO$, $SrO$ and $CaO$ and which is thermally crystallizable at sintering temperatures to yield a highly crystalline, low expansion, thermally stable glass-ceramic; and lead titanate-containing crystallizable sealing glass consisting essentially, apart from incidental impurities, in weight percent of 60 to 80% of $PbO$, up to 20% of at least one divalent metal oxide selected from $ZnO$ and $BaO$ such that the total of divalent oxides and $PbO$ is 60 to 80%, 5 to 18% $TiO_2$, at least 1% $B_2O_3$ and at least 5% $SiO_2$, the total of $B_2O_3$ and $SiO_2$ being 10 to 20%.

10. The method of claim 6, further comprising the step of sintering the intermediate material to form a high density layer.

11. The method of claim 1, wherein the substrate is a honeycomb structure having an inlet and an outlet end portion, and having a matrix of walls defining a plurality of cells or passageways extending longitudinally and mutually parallel therethrough, between the inlet and outlet end portions.

12. The method of claim 1, wherein the means for shielding a portion of the substrate comprises plugging the cells in the portion of the substrate to a predetermined depth.

13. The method of claim 1, wherein the substrate is a ceramic honeycomb structure.

14. The method of claim 13, further comprising the steps of
   (a) applying a layer of pre-cordierite glass to the inlet end portion of the substrate, and
   (b) sintering the glass to form cordierite, and then providing means for shielding a portion of the substrate, and applying a layer of conductive material over the unshielded portion of the substrate.

15. The method of claim 1, wherein the honeycomb structure further comprises slots forming ridges of cell walls.

* * * * *